June 2, 1953  H. T. SWANSON  2,640,952
HYDROGEN PRESSURE CONTROL FOR HYDROGEN
FILLED DISCHARGE TUBES
Filed Feb. 5, 1947

Inventor
Henry T. Swanson
By William A. Zalesak
Attorney

Patented June 2, 1953

2,640,952

UNITED STATES PATENT OFFICE 2,640,952

HYDROGEN PRESSURE CONTROL FOR HYDROGEN FILLED DISCHARGE TUBES

Henry T. Swanson, Lancaster, Pa., assignor to Radio Corporation of America, a corporation of Delaware Application February 5, 1947, Serial No. 726,602

10 Claims. (Cl. 315—108)

My invention relates to the regulation of hydrogen pressure in gaseous conduction electric discharge devices having an atmosphere containing hydrogen, such as hydrogen filled electronic discharge devices in which the discharge is controlled by a grid.

Three-electrode electronic discharge devices having a gaseous filling which is predominantly hydrogen have advantages provided the pressure of hydrogen is maintained within definite limits. During operation of such devices the discharge tends to clean up the hydrogen with consequent lowering of the hydrogen pressure. Various expedients have been proposed to replenish the hydrogen in such tubes, among them the evolution of hydrogen from some material which evolves or liberates hydrogen when heated. As suitable materials hydrides of the alkali and alkaline earth metals have been suggested, as these hydrides when heated decompose with evolution of hydrogen and usually the metal or other residue of the reaction in the tube is not deleterious. The use of these hydrides is not feasible in commercial tubes as exposure of the hydrides, of which barium and calcium hydrides are best adapted for practical use, renders them useless, probably by the formation of oxides. Another objection is that the reaction is not completely reversible, hence evolution of hydrogen may soon exhaust the hydride and render it useless, and overheating may cause evolution of too much hydrogen and excess hydrogen pressure which cannot be reduced to the proper level.

The principal object of my invention is to provide means for controlling and maintaining within the required limits the hydrogen pressure in an electric discharge device having a hydrogen atmosphere.

A further object is to provide means for replenishing the supply of hydrogen at will throughout the useful life of the device without interfering with the operation of the device by an over supply of hydrogen.

In accordance with my invention I provide in the bulb of the hydrogen filled electronic discharge device a mass of zirconium hydride which may be heated at will to a temperature at which hydrogen is evolved. I have found that the evolution of hydrogen from zirconium hydride may be maintained at equilibrium conditions of hydrogen pressure with change in volume which indicates a reversible reaction. For this reason, a mass of zirconium hydride at a temperature in the vicinity of its decomposition temperature will maintain in the bulb a hydrogen pressure which is fairly constant and is dependent upon the temperature of the hydride. For example, it has been found that zirconium hydride on molybdenum or tungsten reaches an equilibrium pressure of 500 microns at a temperature well below red heat. No similar property of equilibrium pressure and no indication of a similar reversible reaction has been observed with the alkaline earth hydrides.

The zirconium hydride in the hydrogen filled tube may be heated at will to the desired temperature in various ways, preferably, by placing the zirconium hydride on a metal carrier which may be maintained at will at the temperature which produces the desired results.

My invention will best be understood from the following description taken in connection with the accompanying drawing in which merely for purposes of illustration I have shown one embodiment of my invention in a simple form of a three electrode tube and in which.

Figure 1:
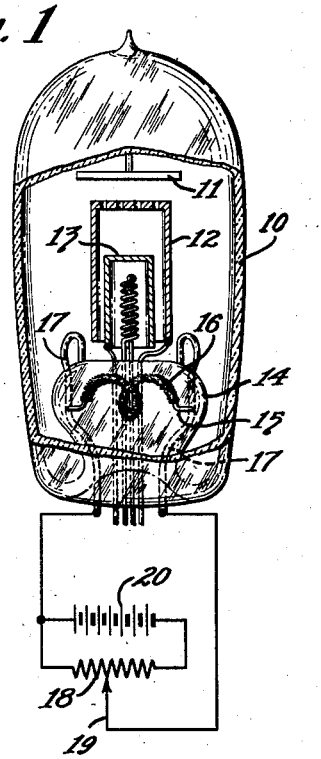
Fig. 1 is a view partly in longitudinal section of a tube with the zirconium hydride carrier shown in elevation.
Figure 3:
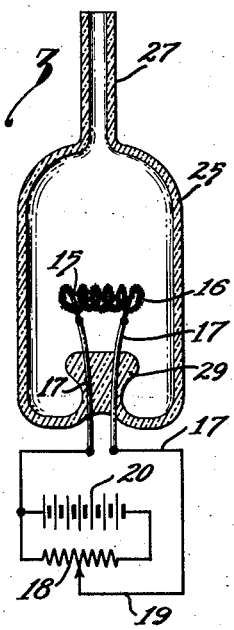
Figure 2:
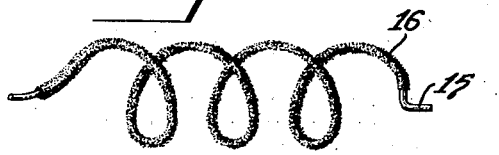
Fig. 2 is a view in elevation of a part of a zirconium hydride coated filament which constitutes a generator of hydrogen.
Figure 4:
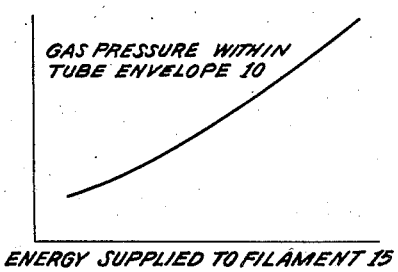

Fig. 3 discloses a tube incorporating a modification according to my invention; and Fig. 4 is a graphic representation of the characteristics of a tube similar to the type of Fig. 1.

The tube shown in the drawing comprises a sealed envelope 10 enclosing an anode or plate 11, a grid 12, and an indirectly heated cathode 13. These electrodes are mounted on a stem 14 shown as a conventional reentrant stem and which may be of any desired form such as a disc or button stem.

For heating the zirconium hydride at will, a carrier 15, preferably a filament of some metal, such as tungsten, in good thermal relation to a mass of zirconium hydride, which is preferably in the form of a coating 16 of powdered zirconium hydride held in place on the carrier by a binder, is heated by passing current through it. In the specific arrangement shown, two leads 17 embedded in the stem, support the carrier 15 and are connected respectively to a potentiometer 18 and a sliding contact 19, by which current through the filament may be controlled. The potentiometer 18 is connected in parallel to a battery 20 which serves as a source of energy for maintaining a current flow through the filament 15. The carrier and associated zirconium hydride may be heated at will in other ways as by means often used to heat getters as shown, for example, in U. S. patent to Lederer, 2,173,258. The circuit of Figs. 1 and 3 is arranged to maintain a constant voltage drop across filament 15 at any given setting of movable contact 19. This results in supplying energy to filament 15 at a constant rate corresponding to the setting of contact 19. Changing the setting of contact 19 will change the amount of electrical energy supplied to filament 15. This energy or wattage can be easily determined from the current flowing through filament 15 and its resistance.

The tube shown is hydrogen filled, the envelope 10 containing an atmosphere consisting predominantly of hydrogen. The hydrogen pressure in the tube should be maintained within the range between 300 microns and 600 microns for best results. Due to cleanup of hydrogen by the discharge in the tube, the hydrogen pressure tends to decrease during operation. To replenish the supply of hydrogen in the tube the zirconium hydride is heated to its decomposition temperature by passing current through the filament 15.

I have found that there is a direct relationship between the gas pressure within the tube envelope 10 and the wattage supplied to the filament 15 by the battery 20. For example, tests with one tube, of the type of Fig. 1, disclose that with a filament circuit input wattage of 1.08, the tube pressure was maintained automatically around 340 microns and with a filament circuit input wattage of 1.85 the tube pressure was maintained automatically around 590 microns. Fig. 4 graphically shows this relationship between the filament input wattage and the gas pressure in microns within a tube similar to that of Fig. 1. An increase in the filament input wattage will cause a corresponding increase in the gas pressure within the tube according to the indicated relationship of Fig. 4. I have also found that if the filament input wattage is lowered, the gas pressure within the tube will drop to the corresponding value indicated by Fig. 4.

An increasement in the filament wattage input will raise the temperature of filament 15 and result in a greater evolution of hydrogen from the hydride coating 16. The pressure of gas within tube envelope 10 will increase to a point at which it becomes comparatively constant, as long as the filament circuit wattage input remains at the new value. This condition indicates that an equilibrium condition is established and that the chemical action taking place is reversible. That is, at a specific temperature of filament 15 and at a corresponding gas pressure within tube envelope 10, as much hydrogen is evolved from the zirconium hydride as is taken up by the zirconium metal resulting from the decomposition of the zirconium hydride. The existence of a reversible condition relative to filament 15 is further supported by the fact that when the filament circuit input wattage is lowered from a specific amount to a new value, the gas pressure within the tube envelope correspondingly drops until it becomes constant at a lower pressure. This appears to indicate that when the temperature of filament 15 is lowered, the evolution of hydrogen from the hydride coating 16 is less than the hydrogen gas taken up by the zirconium metal component of coating 16. This condition will exist until the gas pressure within tube envelope 10 drops to a lower value at which point the evolution and the taking up of hydrogen by coating 16 become equalized. It is thus evident, that for any given temperature of filament 15 within a certain range, the pressure of hydrogen within tube envelope 10 is maintained at a specific value.

Knowing the relationship between the filament circuit wattage input and the pressure within tube envelope 10, sliding contact 19 is set to give the desired input wattage for a required tube pressure. If during tube operation, the tube pressure tends to drop due to the clean-up action of the tube discharge, the tube pressure is automatically restored to or maintained at the required pressure. If the amount of hydrogen within the tube envelope 10 decreases, then less of the gas within the tube will come into contact with and be picked up by the zirconium component of coating 16. At the same time if the temperature of filament 15 remains constant due to a constant wattage input, then the evolution of hydrogen from the hydride coating 16 will remain the same. Thus, the equilibrium reaction is upset and more hydrogen is evolved than picked up by the coating 16, until the pressure of the tube is restored and due to increased pick-up action of the zirconium, an equilibrium condition exists again.

There is also another factor which tends to maintain the pressure constant within the tube. If the voltage across filament 15 is steady, the temperature of filament 15 will not change as long as the heat lost from the coating 16 by conduction and radiation remains constant. Hydrogen has a high specific heat conductivity and is a good convection conductor of heat. However, if the gas pressure within tube envelope 10 drops due to a clean-up of the hydrogen gas, there will be a corresponding decrease in the amount of heat conducted away from coating 16 by the gas within the tube. This results in an automatic rise in the temperature of coating 16 which causes an increase in the evolution of hydrogen from the hydride coating 16. In this manner the gas pressure within the tube envelope 10 is restored.

Since the decomposition of the zirconium hydride is reversible, the two factors described above for restoring the tube pressure will also become operative, if for any reason the pressure within the tube is raised above the desired amount. An increase in the amount of gas present will result in more gas coming into contact with and picked up by the zirconium metal of coating 16. But, if the evolution of hydrogen from the hydride coating 16 remains constant due to a constant filament wattage input, the equilibrium action is upset and more hydrogen is picked up by coating 16 than is evolved. Then the amount of gas within the tube as well as its pressure will decrease until the gas pressure point is reached at which the two reactions are in equilibrium. Furthermore, an increase in the amount of gas within the tube results in a greater conduction of heat from filament 15 by the hydrogen. This results in automatically lowering the temperature of hydride coating 16 and slowing down the evolution of hydrogen until equilibrium conditions are restored.

The zirconium hydride coated filament 15 need not be confined to a gas discharge tube as shown in Fig. 1.

Fig. 3 discloses an application in which the zirconium hydride coated filament 15 is enclosed within a glass envelope 25 having an open tubular extension 27. The hydride filament 15 is supported by leads 17 sealed through a glass press 29 of the envelope 25. In a manner similar to that shown in Fig. 1, leads 17 are connected respectively to a potentiometer 13 and a movable contact 19. The tube 25 may be connected by means of the tubular extension 27 to any desired piece of apparatus (not shown) in which it is necessary to maintain a predetermined gas pressure. Knowing the relationship between the filament circuit wattage input and the gas pressure within the tubular envelope 25, the slide contact 19 is set to maintain the temperature of filament 15 at a point required to keep the pressure within the envelope 25 and the apparatus to which it is connected at the desired amount. The automatic operation of the tube 25 to maintain a constant gas pressure therein is similar to that described for the operation of the corresponding filament of Fig. 1. The actions of the filament 15 of evolving and picking up hydrogen within the tubular envelope 25 will remain in equilibrium at a given filament circuit input wattage and for the corresponding gas pressure within the envelope 25. Since the filament circuit input wattage is kept constant for a desired gas pressure during tube operation, any change in the gas pressure within the envelope 25 will upset the equilibrium of the reversible reactions taking place on the coated filament 15 in such a way as to restore the original tube pressure corresponding to the constant filament circuit input wattage. The factors restoring the desired gas pressure within the envelope 25 are similar to those described above for the tube of Fig. 1.

It is obvious that by various means well known in the art the temperature of the filament 15 may be made dependent upon conditions in the tube or upon current through the tube and an automatic control of the hydrogen pressure achieved.

While a certain specific embodiment of my invention has been illustrated and described, it will be understood that various changes and modifications may be made therein without departing from the spirit and scope of the invention.

What I claim as new is:

1. An electric discharge device comprising a sealed envelope containing hydrogen, electrodes in said envelope for establishing an electric discharge in said envelope, a heater filament in said envelope, a coating of zirconium hydride on said filament, and a pair of lead-in conductors connected to the ends of said filament and extending through the wall of said envelope.

2. An electric discharge device comprising a sealed envelope containing hydrogen, electrodes within said envelope for establishing an electric discharge in said envelope, a filament mounted within said envelope, a coating of zirconium hydride on said filament, means connected to said filament for heating said filament to partially decompose the zirconium hydride of said coating to zirconium metal and to increase the amount of hydrogen within said envelope, said heating means including electric circuit means for providing energy at a constant rate to said filament whereby the evolution of hydrogen gas by said coating will be constant.

3. An electric discharge device comprising a sealed envelope containing hydrogen, electrodes within said envelope for establishing an electric discharge in said envelope, a filament mounted within said envelope, a coating of zirconium hydride on said filament, means connected to said filament for heating said filament to partially decompose the zirconium hydride of said coating to zirconium metal and to increase the amount of hydrogen within said envelope to a desired specific gas pressure, said heating means including an electric circuit for providing energy at a predetermined constant rate during tube operation to maintain the evolution and pickup of hydrogen by said coating in equilibrium at said specific gas pressure within the envelope, said electric circuit including means to vary the amount of energy provided to heat said filament to change the rate of evolution of hydrogen by said coating whereby said specific gas pressure within the envelope will be correspondingly changed.

4. An electric discharge device comprising a sealed envelope containing hydrogen, electrodes within said envelope for establishing an electric discharge in said envelope, a filament mounted within said envelope, a coating of zirconium hydride on said filament, an electric circuit connected to said filament for heating said filament to partially decompose the zirconium hydride of said coating to zirconium metal and to increase the amount of hydrogen within said envelope, said electric circuit including a regulating device for adjusting to predetermined values the rate at which energy is supplied to heat said filament, whereby the gas within said envelope will be established at corresponding pressures.

5. Apparatus comprising a closed envelope adapted to be sealed from the air, a filament mounted within said envelope, a coating of zirconium hydride on said filament, means connected to said filament for heating said filament to partially decompose the zirconium hydride of said coating to zirconium metal and to provide hydrogen gas within said envelope at a specific gas pressure, said heating means including a source of energy and a regulating device to vary the amount of energy provided to heat said filament for changing the rate of evolution of hydrogen by said coating whereby said specific gas pressure within the envelope will be correspondingly changed.

6. Apparatus comprising an envelope adapted to be sealed in communication with a closed container of gas at a specific pressure, a filament mounted within said envelope, a coating of zirconium hydride on said filament, circuit means connected to said filament for supplying an electrical current at a constant rate for heating said filament to decompose said zirconium hydride to zirconium metal and hydrogen, said electrical circuit means including a device for adjusting to a predetermined value the rate at which the current is supplied to heat said filament when said envelope is sealed in communication with said closed container whereby said hydrogen within said envelope will be maintained at said specific gas pressure.

7. An electric discharge device comprising a sealed envelope, hydrogen gas within said envelope at a specific gas pressure, electrodes mounted within said envelope for establishing an electric discharge therebetween, a filament mounted within said envelope, a coating of zirconium hydride on said filament and exposed to said hydrogen gas, an electric circuit including said filament and a source of current for heating said filament to decompose said zirconium hydride to zirconium metal and hydrogen, said electric circuit including means for supplying electrical energy to said filament at a predetermined rate during tube operation to maintain the evolution and pick-up of hydrogen by said coating in equilibrium at said specific gas pressure within said envelope and a regulating means for adjusting to predetermined values the rate at which electrical energy is supplied to heat said filament whereby the gas within said envelope will be changed to corresponding pressures.

8. An electron discharge device comprising a sealed envelope containing hydrogen, a plurality of electrodes in said envelope for establishing an electron discharge in said envelope, a heater filament mounted in said envelope and exposed to said hydrogen, a coating of a pure metallic hydride on said filament, and a pair of lead-in conductors connected to the ends of said filament and extending to the wall of said envelope.

9. An electron discharge device comprising a sealed envelope containing hydrogen, electrodes within said envelope for establishing an electric discharge in said envelope, a filament mounted within said envelope and exposed to said hydrogen, a coating of a metallic hydride on said filament, means including said filament for heating said metallic hydride to partially decompose said metallic hydride to pure metal and to increase the amount of hydrogen in said envelope to a desired specific gas pressure, said heating means including an energy source and a regulating device for providing energy at a predetermined constant rate during tube operation whereby the evolution and pickup of hydrogen by said filament coating is maintained in equilibrium at said specific gas pressure within the envelope.

10. An electric discharge device comprising a sealed envelope containing hydrogen, electrodes within said envelope for establishing an electric discharge in said envelope, a filament mounted within said envelope and exposed to said hydrogen, a coating of a metallic hydride on said filament, means connected to said filament for heating said filament to partially decompose the metallic hydride of said coating to pure metal and to increase the amount of hydrogen within said envelope to a desired specific gas pressure, said heating means including an electric circuit for providing energy at a predetermined constant rate during tube operation whereby the evolution and pickup of hydrogen by said coating are maintained in equilibrium at said specific gas pressure within the envelope, said electrical circuit including means to vary the amount of energy provided to said filament to change the rate of evolution of hydrogen by said coating whereby said specific gas pressure within the envelope will be correspondingly changed.

HENRY T. SWANSON.

References Cited in the file of this patent

UNITED STATES PATENTS

| Number | Name | Date |
|---|---|---|
| 1,495,279 | Van Der Bijl | May 27, 1924 |
| 2,368,060 | Wooten | Jan. 23, 1945 |
| 2,437,941 | Dorgels | Mar. 16, 1948 |
| 2,497,911 | Reilly et al. | Feb. 21, 1950 |

FOREIGN PATENTS

| Number | Country | Date |
|---|---|---|
| 240,863 | Great Britain | Apr. 4, 1927 |